United States Patent [19]

Razza

[11] 4,436,129
[45] Mar. 13, 1984

[54] COMPOSITE SEMIRIGID SNOW CHAIN, WITHOUT REAR HOOKING MEANS, FOR MOTOR VEHICLES

[76] Inventor: Aldo Razza, No. 63, Via Pio Foà, Rome, Italy

[21] Appl. No.: 449,958

[22] Filed: Dec. 15, 1982

[30] Foreign Application Priority Data

Dec. 18, 1981 [IT]  Italy ............................ 362217/81[U]

[51] Int. Cl.³ ............................................ B60C 27/00
[52] U.S. Cl. ................................ 152/213 A; 152/219; 152/223; 152/242
[58] Field of Search .............. 152/213 R, 213 A, 219, 152/217, 221, 223, 241, 242, 225–230

[56] References Cited

U.S. PATENT DOCUMENTS 2,748,826  6/1956  Dore ............................... 152/229 X
3,918,504 11/1975  Prokesch ........................ 152/217 X Primary Examiner—William A. Powell
Assistant Examiner—Thomas Bokan
Attorney, Agent, or Firm—Beveridge, DeGrandi and Kline

[57] ABSTRACT

A composite semirigid snow chain without rear hooking means, for motor vehicles, consisting of two parts to be independently applied onto a wheel and to be connected to one another at a sole side, that is at a sole side of the wheel, by means of an elastic device having a controllable clearance, each of said parts being provided with friction elements.

3 Claims, 3 Drawing Figures

COMPOSITE SEMIRIGID SNOW CHAIN, WITHOUT REAR HOOKING MEANS, FOR MOTOR VEHICLES

The present invention refers to a new kind of snow chains for motor vehicles. More particularly, the invention relates to composite, semirigid snow chains, without rear hooking means.

There are known in the art a large number of types of snow chains for motor vehicles.

A plurality of snow chain types for motor vehicles are known in the art, ranging from chains with cross bars or with rhombus shaped elements or also with elements having other geometrical shape, in dependance on both the vehicle type and intended use of the chains, to plastic material chains with cross bars or friction elements of several shapes.

The main drawback of all the known chain types is the complexity of the mounting operation. In effect, as it is well known, the chains are not rigid and for mounting them it is necessary to lay out the chain on the ground, to displace then the car so as to place the wheel on the chain and to hook thereafter the chain on the rear and front side of the wheel. The hooking of the chain on the rear side of the wheel is the most difficult and tiresome operation.

An object of the invention is, thus, that to provide a new chain type which does not require both the laying out of the chain on the ground and displacing of the car.

A further object of the present invention is that to provide a chain which does not require a hooking operation thereof on the rear side of the wheel.

Summarizing, the purpose of the invention is to provide a snow chain having a very simple, but at the same time strong structure allowing an extremely easy and comfortable mounting operation.

The chain according to the invention is defined as a composite chain owing to that it comprises two parts each of which is applied onto the wheel independently of one another and are then hooked to one another at a sole side only, that is on the front side and in other words on the outer side of the wheel, by means of an elastic device having a controllable clearance.

The chain according to the present invention is defined also as semirigid since each of the two parts thereof comprises an intrinsically rigid but at the same time limitedly flexible framework which comprises two semicircle shaped bars connected at their ends to one another by two bridge elements, between which there are provided chain segments or plastic strips or like. The elastic hooking device with a controllable clearance is of the kind having a spring and a stop element for limiting the stretching of the spring.

Other features and particularities of the present invention will result from the following description with reference to the enclosed drawings which should be construed in an illustrative and not limitative sense.

Figure 1:
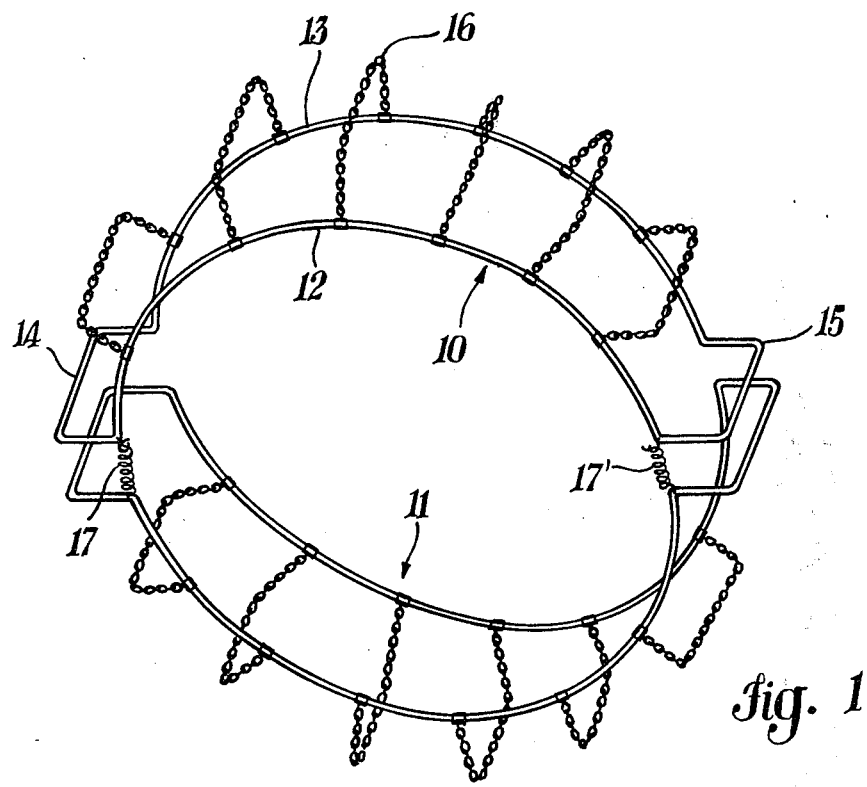
FIG. 1 shows a perspective view of the assembly of the two chain parts according to the present invention.

In the drawing the same reference numerals have been used to indicate the same parts; moreover, it should be emphasized that several parts are shown with some deformed details for the sake of clearness of illustration and that by the term "chain" it should be understood the assembly of the device to be applied onto each single wheel.

Referring now to the drawings, it may be noted that the composite chain according with the present invention comprises two independent parts or frameworks 10 and 11, having the same structure. Each of the two parts 10 and 11 comprises two semicircle shaped bars 12 and 13, the radius of which is smaller than that of the wheel, onto which the chain is to be applied.

The two semicircle bars 12 and 13 are connected to one another by two bridge elements 14 and 15. The assembly formed by the two semicircle bars 13, 14 and two bridge elements 14, 15 forms thus a framework, which is per se a rigid structure but has certain flexibility allowing to slightly and elastically deform it for applying the chain onto the wheel.

As it may be seen, a certain number of friction segments, such as chain segments 16 or plastic segments or rhombus shaped chain segments are arranged between the two semicircle bars 12 and 13, likely as in conventional chain kinds.

Obviously, the two bridge elements 14 and 15 have the sole function to rigidly but flexibly connect the two bars 12 and 13 with one another and thus, they may be made of iron rods or elastic clamps and even if are shown as rectangular half rings with beveled corners, they may have the shape of circular, elliptic or likely shaped half rings.

As already said, the two parts 10 and 11 of the composite chain have the same structure and thus, also the part 11 has two semicircular bars, two closure bridge elements and friction members.

In the operative position, the two frameworks 10 and 11 are hooked one with another only on one side, namely on the outer side, by means of a hooking device which, as already said, has an elastic structure and a controllable clearance.

For example, the hooking device is provided with a spring or another element adapted to elastically keep together the two parts 10 and 11 of the chain; however, for limiting the stretching of the spring, a stop element should be provided, since otherwise during the operation the two parts would displace from one another and separate from the wheel.

As stop element it may be used a hook, a spring catch or like know devices of this kind available on the market.

Figure 2:
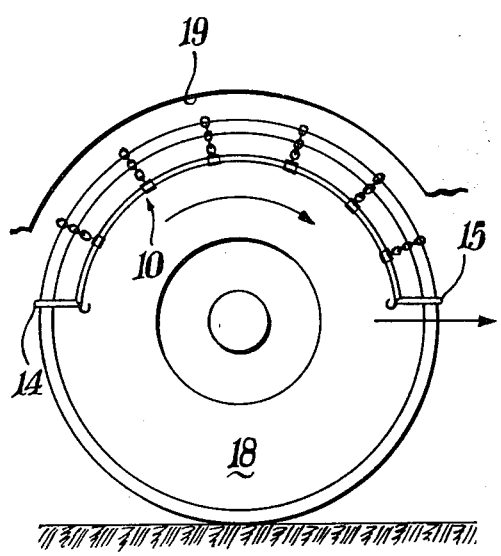
FIG. 2 is a side view showing a wheel on which a first part of the chain has been applied and FIG. 3 shows a side view of the wheel of FIG. 2 which wheel has been rotated for a half revolution for applying the second part of the chain.
Figure 3:
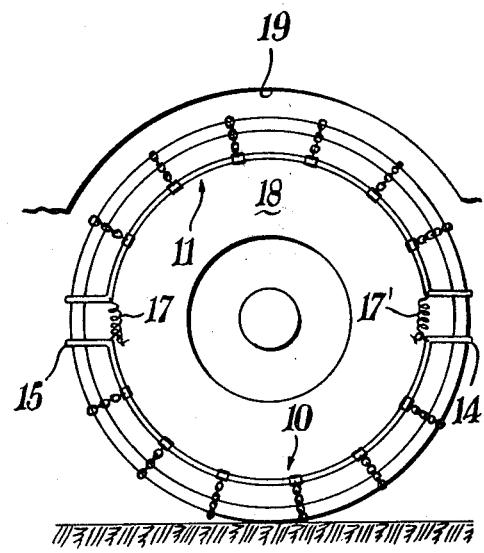

The operations to be performed for mounting the composite chain are shown in FIGS. 2 and 3.

The first part 10 of the composite chain is firstly inserted above the wheel 18 between the wheel itself and the edge 19 of the wheel well or mudguard. This operation is rendered easy by both the rigidity of the assembly of the bars 12, 13 and bridge elements 14, 15 and their limited flexibility. After having applied the first part 10, the vehicle is moved for a half revolution of the wheel (thus passing from the position shown in FIG. 2 to that of FIG. 3) and the second part 11 is applied. The two parts are then connected to one another by two hooking devices 17 and 17', which have been already disclosed.

Summarizing, the present invention provides a new structure for chains, comprising two parts which are intrinsically rigid but sufficiently flexible for being separately applied onto the wheel; such parts are hooked to one another on a sole side by means of elastic device having a controllable clearance. However, it would be understood that one skilled in the art may carry out several modifications and changes of constructive details without deviation from the principles which allow to attain the advantages of comfortable, convenient and easy use as well as of utility of the above disclosed, illustrated and hereinafter claimed structure.

I claim:

1. A snow chain for motor vehicles having two parts adapted to be applied to a wheel independently of each other, means for connecting said parts together on the wheel, each of said parts including a frame which is essentially rigid but has a limited flexibility formed of two semicircular bars lying in spaced radial planes and two U-shaped bridge elements connecting said bars at their ends for maintaining the bars in spaced radial planes, said parts having flexible friction elements which are connected to and arranged in spaced relation between said U-shaped bridge elements, an elastic connecting element connecting said two parts together at each end thereof and stop means for limiting the stretching of said elastic element, said parts being located around substantially the entire surface of the wheel.

2. A snow chain as claimed in claim 1, wherein said semicircular bars have a radius smaller than that of the wheel onto which they are mounted.

3. A snow chain according to claim 1 wherein said connecting elements lie in and form a portion of a circle which is concentric with two semicircular bars of said frames.

* * * * *